United States Patent [19]

Rasper et al.

[11] Patent Number: 4,663,042
[45] Date of Patent: May 5, 1987

[54] POLYMERIC SLUDGE COLLECTOR FLIGHT

[75] Inventors: Susan M. Rasper, Brookfield; James H. Wiegand, Franklin, both of Wis.

[73] Assignee: Envirex Inc., Waukesha, Wis.

[21] Appl. No.: 769,109

[22] Filed: Aug. 26, 1985

[51] Int. Cl.⁴ .................. B01D 21/04; B01D 21/18
[52] U.S. Cl. ............................. 210/525; 210/526; 198/731; 198/734
[58] Field of Search ............... 210/523, 525, 526, 524, 210/527, 528; 198/731, 734

[56] References Cited

U.S. PATENT DOCUMENTS

| 2,056,062 | 9/1936 | Zack | 210/526 |
| 2,131,690 | 9/1938 | Marshall | 210/524 |
| 2,393,725 | 1/1946 | Walker | 210/526 |
| 2,888,143 | 5/1959 | Seidenstricker | 210/525 |
| 3,313,422 | 4/1967 | Swenson | 210/523 |
| 3,394,816 | 7/1968 | Lowry | 210/525 |

FOREIGN PATENT DOCUMENTS 625103 8/1961 Canada .
178671 3/1962 Sweden .
575286 10/1977 U.S.S.R. .

Primary Examiner—Benoit Castel
Assistant Examiner—Linda S. Evans
Attorney, Agent, or Firm—Lawrence J. Crain

[57] ABSTRACT

A hollow, polymeric sludge collector flight is provided having a sigma-shaped cross-section, including a wedge-shaped transverse indentation on its forward face, a vertically extending wear lip on its scraping edge, and a transverse gap on its rear face. The gap allows free circulation of liquid within the non-buoyant flight. The indentation structurally stiffens the mid-span section of the flight. Where additional stiffness is required, filler blocks may be placed between mounting blocks.

16 Claims, 6 Drawing Figures

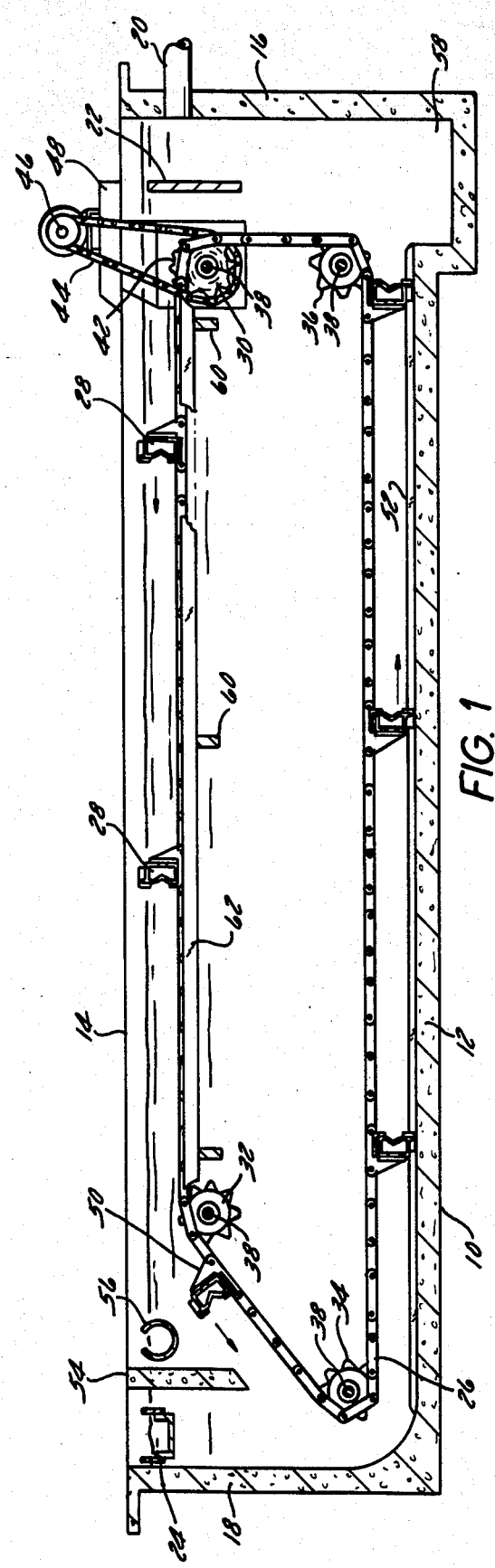
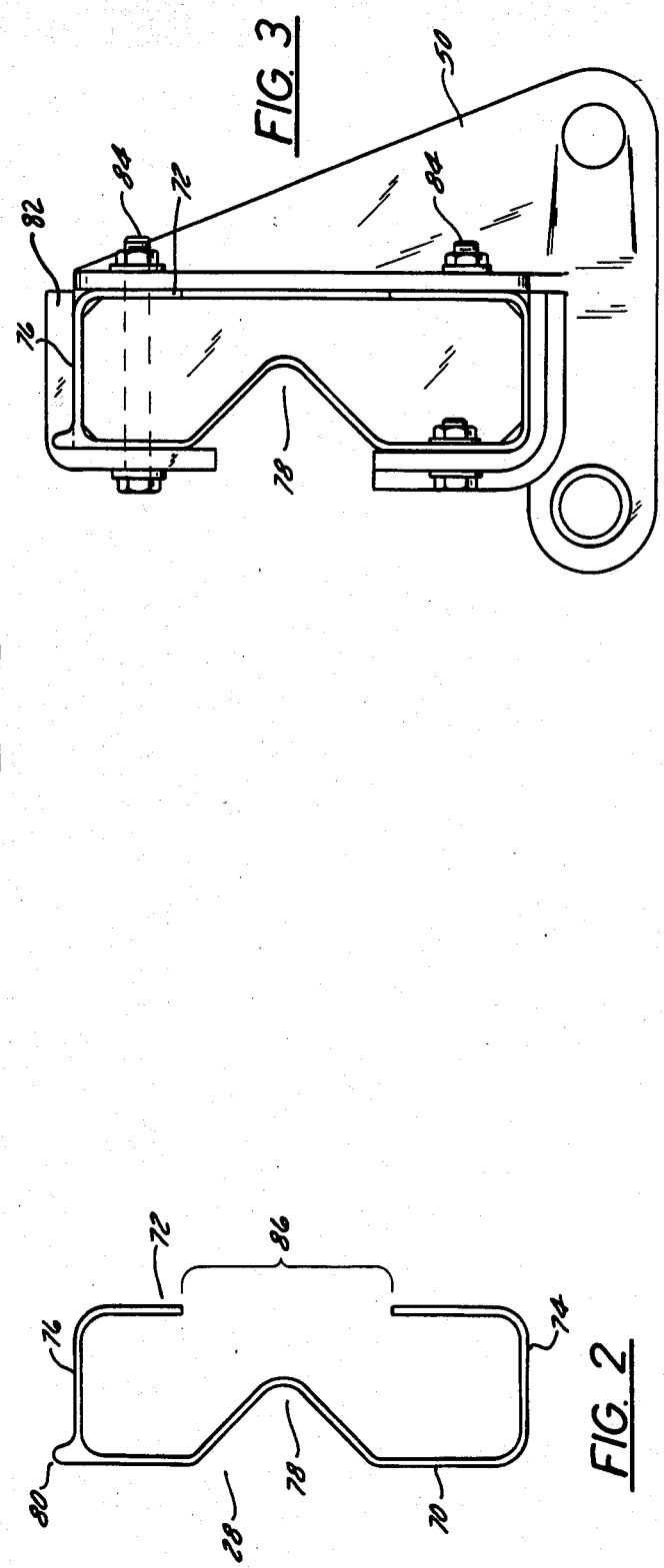

POLYMERIC SLUDGE COLLECTOR FLIGHT

BACKGROUND OF THE INVENTION

The present invention relates to collector flights mounted on sludge collector mechanisms in sedimentation tanks used in municipal and industrial waste treatment plants and in potable water treatment plants to collect and convey settled sludge as well as floating wastes to the point of ultimate disposal within the sedimentation tanks. More specifically, the invention discloses a fiberglass-reinforced polymeric sludge collector flight which is not susceptible to either the corrosive forces found in waste water or the potentially damaging physical stresses encountered by longer flights used in sedimentation tanks with widths of approximately 20 feet.

Sludge collector mechanisms are used in the sedimentation tanks of wastewater and potable water treatment plants to scrape the settled sludge from the bottom of the tank and to skim the floating waste material from the surface of the waste water. Typically, sludge collectors include transverse flights which are carried on a pair of drive chains in a circuit along the bottom of the tank as well as along the surface of the water in the tank to accomplish the scraping and skimming functions.

The end regions of collector flights are equipped with means to mount the flights on the drive chains. The drive chains are looped around collector chain sprockets which are mounted on cross shafts, with the sprockets located near the side walls of the tank to minimize shaft deflection. However, a significant drawback of this arrangement is that collector flights have a substantial unsupported length between the chains which is subject to flexing and sagging forces from the sludge scraping and surface skimming process. Thus, it is preferable to have flights which are stiff enough to resist these forces yet are not prone to cracking or breaking.

Conventional flights have been made of wood, as disclosed by Walker in U.S. Pat. No. 2,393,725, or steel, as disclosed by Zack in U.S. Pat. No. 2,056,062 and Canadian Pat. No. 625,103 to Mans. Although these prior designs performed these intended functions fairly adequately, their drawbacks have been amplified as many plant operators replace heavy, corrosion-prone metal chain with lighter, non-corroding polymeric chain. Thus, in addition to the prior problems of wooden flights, which were subject to rotting and warping, and steel flights which corroded, when used in conjunction with polymeric chain these heavier flights put a strain on chain links which significantly decreases the usable life of those chains.

There have been attempts to fabricate polymeric collector flights, as disclosed in U.S. Pat. Nos. 3,313,422 to Swenson and 3,394,816 to Lowry, but these flights were purposely designed to be buoyant as a means of reducing the operating load of the metal chain equipped apparatus. Buoyant flights are incompatible with polymeric chain because the chain is not heavy enough to keep the flights in contact with the floor of the tank, as the prior metal chain did, and prevents the efficient collection of settled sludge.

Prior polymeric collector flights were also subject to sagging and flexing in the long unsupported area between the two chains.

In the case of 20 foot long flights, the chains mount approximately 2.5 feet from the ends of the flight, leaving approximately 15 feet of flight unsupported. To provide additional strength and buoyancy, the prior polymeric flights were comprised of hollow, rectangular channels having provisions for the insertion of rigid internal support members extending the length of the flight. Despite the addition of supplemental support members, the length of this unsupported span was too great for even the weight of the cast iron chain, and the buoyant center tended to lift upward, causing the flight to camber.

This center camber effect caused the undesirable result of severe abrasion of the ends of the flight which were dragged along the concrete floor of the tank. Eventually, the ends became so abraded that holes were created, after which entire chunks of the thin polymeric shell of the flight began to break off. Not only did this situation allow the build up of sludge in the center of the tank by virtue of the cambered flights not making adequate contact with the tank floor, but the creation of holes in the flight allowed sewage to seep into the flight and become trapped, where it putrified, causing a severe odor problem.

Attempts to solve the cambering problem usually involved the addition of heavier support members into the polymeric flights, which defeated the purpose of using a lightweight flight to buoy the heavy metal chain.

Thus, there is a definite need for a sludge collector flight which is non-buoyant, light enough to be compatible with polymeric chain, yet strong enough to withstand the mid-span stresses due to heavy sludge loads, and which allows for the escape of any sludge which becomes trapped in the interior of the flight.

It is therefore an objective of the present invention to provide a polymeric collector flight which is compatible with polymeric chain.

It is a further objective of the present invention to provide a polymeric collector flight which is non-buoyant.

It is a still further objective of the present invention to provide a polymeric collector flight which is capable of withstanding the force of excessive mid-span sludge load.

It is another objective of the present invention to provide a polymeric collector flight which allows the easy escape of internally trapped sludge.

SUMMARY OF THE INVENTION

The present invention discloses a sludge collector flight designed to collect both submerged and floating waste matter in a sedimentation tank in which said flight is mounted transversely on a pair of rotating articulated chains which push settled sludge along the bottom of the tank and skim floatable waste from the surface of the waste water.

The collector flight of the present invention is comprised of an elongate, hollow, fiberglass-reinforced polymeric sleeve having a substantially rectangular cross-section, however, the cross-section can be more accurately described as being shaped like the Greek letter "sigma".

The present collector flight has distinctive front and rear side faces, the front face is substantially vertical, except for a wedge-shaped indentation which is oriented substantially horizontally and extends approximately the length of the flight. The transverse, wedge-shaped indentation serves the function of structurally stiffening the mid-span section of the flight. The front side face is also equipped with a vertically extending scraper flange along the lower margin designed to wear to conform to the irregularities of the tank floor without affecting the structural integrity of the flight.

The rear face is also substantially vertical, except for a horizontal transverse gap which separates the rear side into upper and lower margins. This transverse gap in the rear face prevents buoyancy by allowing water to freely circulate throughout the interior of the flight. Freely circulating waste water also acts as a flushing agent to prevent the accumulation of putrifiable sludge. The horizontal wedge of the front side and the transverse gap of the rear side are constructed and arranged to be approximately the same height and are located approximately the same distance from the bottom edge of the flight.

When the collector flight of the present invention is mounted to the chain, a mounting block having a corresponding cross-section to the interior of the flight is inserted at each point of attachment to serve both a stiffening function and to provide a solid backing for the fasteners which hold the chain mounting means to the flight.

In applications where additional stiffening is required, supplemental captive filler blocks may be inserted into the flight between the two chains. The captive filler block is held in place by a friction fit in conjunction with adhesive or threaded fasteners.

DESCRIPTION OF THE DRAWINGS

The invention and its many attendant objects and advantages will become better understood by reference to the following drawings, wherein, FIG. 1 is a longitudinal sectional view of a settling tank embodying the collector flight of the present invention;

FIG. 2 is a cross-sectional view of the collector flight of the present invention in an inverted position;

FIG. 3 is a side view of the collector flight shown in FIG. 2 assembled for installation in a settling tank;

DESCRIPTION OF THE PREFERRED EMBODIMENT

Figure 4:
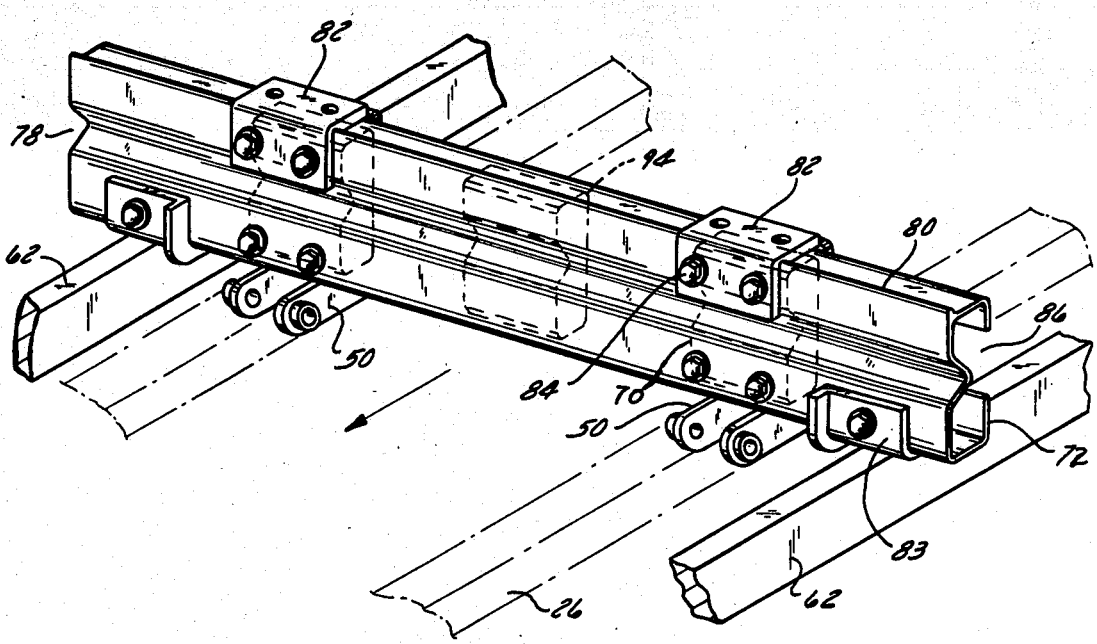
FIG. 4 is an elevational perspective view of the front face of the collector flight shown in FIG. 2 as it would appear in its scum collecting mode.

Referring now to the drawings wherein like reference characters designate identical or corresponding parts, FIG. 1 illustrates a primary settling tank 10 which is usually formed of reinforced concrete. The tank 10 comprises a bottom 12, a pair of opposite side walls 14, and influent end wall 16 and an effluent end wall 18. A conduit 20 extends through the influent end wall 16 and delivers the liquid into the tank 10. A baffle 22 extends across the top of the tank 10 and between side walls 14, and extends downwardly in front of and somewhat below conduit 20 to minimize the turbulence created by the influent flow. The waste water flows steadily through the settling tank 10 from the influent end wall 16 to the effluent end wall 18. One or more box weirs 24 near the effluent end wall 18 provide transverse channels for the flow of liquid out of the settling tank 10.

As the liquid flows through the tank, the settlable solids or sludge descend to the bottom 12, and the floatable wastes or scum rise to the surface of the fluid. A collector mechanism is located in tank 10 to facilitate the removal of floating and submerged wastes. The collector mechanism includes a pair of endless chains 26, preferably fabricated of polymeric material, each of which is located adjacent to one of the side walls 14. The endless chains 26 preferably serve as the carriers for the transverse collector flights 28, however, other flexible driving elements may be substituted. The endless chains 26 are parallel to each other and are trained around pairs of sprockets 30, 32, 34, and 36, all of which have teeth for engaging said chains. Each pair of sprockets 30, 32, 34, and 36 is mounted on a transversely extending shaft 38, the ends of which are rotatably mounted in bearings (not shown). The bearings for each shaft are secured to the side walls 14. The shaft 38 for the pair of sprocket wheels 30 has a driving sprocket 42 secured thereto, which is engaged by a driving chain 44 extending downwardly from a power drive unit 46 mounted on a platform 48. Thus, the pair of sprockets 30 drive the endless chains 26. The other pairs of sprockets 32, 34, and 36 engage the endless chains to guide their travel in tank 10.

A plurality of transversely extending collector flights 28 are secured to the endless chains 26 at selected sequential positions along the chains. The collector flights 28 are secured to the chains 26 by attachment links 50 which are part of each chain 26.

In the bottom 12 of tank 10, there are embedded a pair of substantially parallel rails 52, which extend longitudinally in the tank 10 and extend slightly above the bottom 12 of tank 10 to provide tracks for the flights 28 as they are moved along the bottom 12 of tank 10 from the effluent end wall 18 through to the influent end wall 16 to collect settled sludge.

A baffle 54 extends across tank 10 in a position upstream of the effluent end wall 18 and prevents the floating waste from flowing further downstream. Upstream of the baffle 54 and in front of the same, there is provided a collecting trough 56 for the floating wastes, and as the latter are skimmed from the surface of the waste water, they are received in the collecting trough 56 to be discharged from tank 10. Similarly, at the influent end wall 16 there is provided a sludge trough 58 in which the sludge is deposited as it is collected from the tank bottom 12. The sludge is pumped from sludge trough 58 intermittently or continuously in accordance with the process requirements.

A plurality of brackets 60 are secured to each side wall 14 below the tops of the same and at longitudinally spaced positions along the side wall 14. A rail 62 is secured to the brackets 60 on each side wall 14. The rail 62 extends longitudinally along the side walls and provide tracks for the flights 28 as they are moved along the surface to skim the floatable waste therefrom.

The rails 62 are located at such an elevation that the transverse flights 28 are partially submerged in the waste water as they ride along the rail 62.

Figure 5:
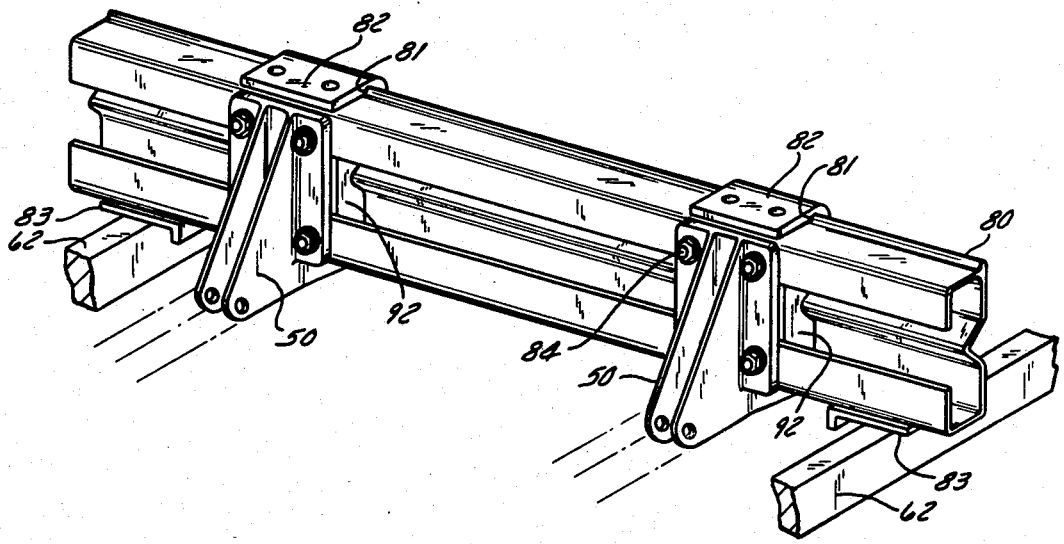
FIG. 5 is an elevational perspective view of the rear face of the collector flight shown in FIG. 4.
Figure 6:
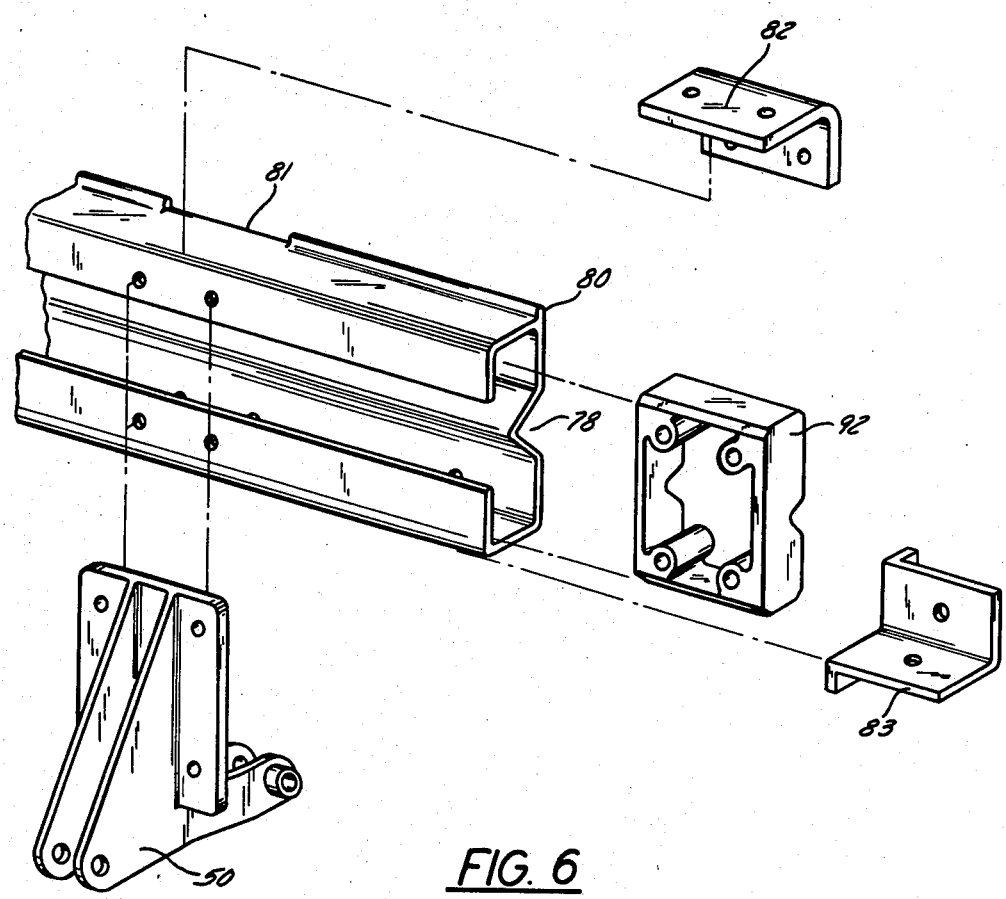
FIG. 6 is an exploded view of the collector flight and mounting assembly of the present invention.

The configuration of the flights 28 is illustrated in greater detail in FIGS. 2-6. The flights 28 are constructed of a fiberglass-reinforced polymeric material resistant to corrosive compounds of waste water, that polymer preferably being thermoset polyester.

The elongate flight 28 is of substantially hollow, rectangular construction comprised of a front face 70, a rear face 72, a top 74, and bottom 76, but because of its unique features, it appears "sigma" shaped in a cross-section. The front face 70 is essentially vertically flat except for the presence of an inwardly-protecting transverse wedge 78 located in the approximate center of the front face 70 and comprising on the order of ⅓ the total height of said face. The wedge 78 extends approximately ¼ to ⅓ the depth of said flight 28, measured as the distance between the vertical portions of the front face 70 and rear face 72. In the preferred embodiment, the wedge 78 extends the entire length of flight 28. The inwardly projecting transverse wedge 78 serves as a stiffening means to prevent midspan flexing due to the impact of the sludge force.

The rear face 72 of flight 28 is essentially a vertically flat plane with a tranverse gap 86 extending on a substantially horizontal axis of flight 28. The gap is designed to prevent buoyancy by allowing the free flow of sewage through the interior of flight 28. In the preferred embodiment, the gap 86 extends the entire length of flight 28, and is preferably located at the approximate height of the wedge 78.

The front face is further comprised of a vertically extending lip portion 80 on its lower margin. This lip portion is essentially a thick end rib of polymer which is designed to abrade against the floor 12 of tank 10 as the flight 28 moves in its sludge collecting path. After a short period of operation, the lower edge of front face 70 will conform to the often irregular surface of floor 12, providing an effective sludge collection barrier.

In order to prolong the useful life of flight 28 by controlling the above-mentioned abrasion process, flight 28 is provided with a pair of notches 81 into which are fitted a pair of L-shaped polymeric wear shoes 82 on the bottom side of flight 28. Wear shoes 82 are constructed and arranged to travel along the rails 52. A second pair of wear shoes 83 are fitted to the top side of the flight to travel along rails 62. The wear shoes 82 and 83 may be fixed to the flight 28 by threaded fasteners 84.

Flight 28 is mounted to the endless chains 26 by means of a polymeric attachment link 50, connected to the flight by threaded fasteners 84. Since the polymeric material has the tendency to crack when excessive torque is applied to the threaded fasteners 84, polymeric mounting blocks 92 are placed in the interior of the flight 28 to provide support. The exterior configuration of the mounting block 92 is constructed and arranged to match the interior dimension of flight 28 so that once inserted, mounting block 92 forms an integral bulkhead in said flight. Mounting blocks 92 are inserted through the open end of flight 28 and are secured by adhesive or threaded fasteners 84.

Where additional stiffness is required, additional captive polymeric filler blocks 94 may be placed between the two mounting blocks 92 at locations where midspan flexing is occurring. The filler blocks 94 are relatively short in length and open in section so that the free flow of water within the flight 28 is not impaired. The filler blocks 94 have substantially the same cross-sectional configuration as mounting blocks 92 so that they fit snugly into the interior of flight 28. Like the mounting blocks 92, filler blocks 94 are inserted into the open end of the flight 28 and may be secured to the flight by adhesive or threaded fasteners 84.

Thus, the present invention provides a polymeric sludge collector flight which is designed to be non-buoyant for compatibility with polymeric collector chains, is resistant to mid-span flexing from the force of collected sludge, and will not trap putrescent sludge in its interior to cause an odor problem.

While a particular embodiment of the collector flight has been shown and described, it will be obvious to persons skilled in the art that changes and modifications might be made without departing from the invention in its broader aspects. It is the aim of the dependent claims to cover all such changes and modifications as fall within the true scope and spirit of the invention.

What is claimed is:

1. An elongate sludge collector flight for the collection of sludge in a tank containing a body of liquid in which said flight is mounted transversely on a pair of rotating articulable chains to push settled sludge along the bottom of said tank and skim floatable waste from the surface of said liquid, wherein the improvement comprises:

said collector flight comprised of an elongate hollow polymeric sleeve having a substantially rectangular cross section comprising a substantially vertical front side, a rear side and a space therebetween, said space giving said flight a depth;

said front side having a transverse wedge-shaped indentation extending the approximate length of said sleeve, said indentation projecting inwardly into said depth of said sleeve a distance sufficient to provide structural stiffening of said flight, and located between upper and lower veritcal portions of said front side, said front side also having a vertically extending scraper flange along the entire lower margin thereof;

said rear side comprised of upper and lower margins separated by a transverse gap and which allows the circulation of said liquid through said space;

internal stiffening means; and mounting means for securing said flight to said chain.

2. The sludge collector flight defined in claim 1 wherein said wedge-shaped indentation extends the entire length of said sleeve.

3. The sludge collector flight defined in claim 2 wherein said wedge-shaped indentation occupies the central third of said front side.

4. The sludge collector flight defined in claim 1 wherein the height of said wedge-shaped indentation substantially corresponds to the height of said transverse gap on said rear side.

5. The sludge collector flight defined in claim 1 wherein said transverse gap on said rear side extends the entire length of said sleeve.

6. The sludge collector flight defined in claim 5 wherein said transverse gap occupies approximately the central third of said rear side.

7. The sludge collector flight defined in claim 1 wherein said wedge-shaped indentation extends approximately one-fourth to one-third the depth of said sleeve.

8. The sludge collector flight defined in claim 1 wherein said internal stiffening means is comprised of at least one filler block having a cross section corresponding to the cross section of the interior of said hollow sleeve and constructed and arranged to slidably engage said sleeve.

9. The sludge collector flight defined in claim 8 wherein said filler block is located in said sleeve adjacent to said mounting means.

10. The sludge collector flight defined in claim 9 wherein said filler block is located between respective mounting means.

11. The sludge collector flight defined in claim 8 wherein said filler block is hollow.

12. The sludge collector flight defined in claim 1 wherein said lower margin of said front side of said flight is fitted with at least two 'L' shaped polymeric wear shoes.

13. The sludge collector flight defined in claim, 12 further comprising a pair of notches in said vertically extending flange arranged to accommodate said wear shoes.

14. The sludge collector flight defined in claim 1 wherein said flight is fabricated from reinforced thermoset polyester resin.

15. An elongate polymeric sludge collector flight for the collection of sewage in a tank containing a body of liquid in which said flight pushes settled sludge along the bottom and skims floatable waste from the surface of said liquid, wherein the improvement comprises:

said collector flight having a sigma-shaped cross section comprised of a front side, a rear side and an interior portion, said front side having an inwardly extending transverse wedge, said rear side having a horizontal gap spaced approximately midway up the height of said rear side and allowing the circulation of said liquid through the interior of said flight, said wedge and said horizontal gap positioned at approximately the same height on said flight, said front side also having a vertically extending scraper flange along the entire lower margin thereof.

16. An elongate sludge collector flight for the collection of sludge in a tank containing a body of liquid in which said flight is mounted transversely on a pair of rotating articulable chains to push settled sludge along the bottom of said tank and skim floatable waste from the surface of said liquid, wherein the improvement comprises:

said collector flight comprised of an elongate hollow polymeric sleeve having a substantially rectangular cross section, comprising a substantially vertical front side, a rear side and a space therebetween, said space giving said flight a depth;

said front side having a transverse, wedge-shaped indentation extending the entire length of said sleeve, and positioned in the central third of said front side, said indentation projecting inwardly into said depth of said sleeve approximately $\frac{1}{4}$ to $\frac{1}{3}$ the depth of said sleeve, said front side also having a vertically extending scraper flange along the entire lower margin thereof;

said rear side comprised of upper and lower margins separated by a transverse gap, said gap approximately coextensive with said indentation and designed to allow the circulation of said liquid through said space;

internal stiffening means; and mounting means for securing said flight to said chain.

* * * * *